United States Patent
Buchs et al.

(10) Patent No.: US 6,729,581 B2
(45) Date of Patent: May 4, 2004

(54) SUPPORTING ARM OF A PASSENGER DOOR OF AN AIRCRAFT

(75) Inventors: Wolfgang Buchs, Oberndorf (DE); Ralf Schmidt, Donauworth (DE); Herbert Schramm, Weinding (DE); Bernd Wuest, Donauworth (DE)

(73) Assignee: Eurocopter Deutschland GmbH, Donauworth (DE)

( * ) Notice: Subject to any disclaimer, the term of this patent is extended or adjusted under 35 U.S.C. 154(b) by 0 days.

(21) Appl. No.: 10/227,540

(22) Filed: Aug. 26, 2002

(65) Prior Publication Data

US 2003/0057603 A1 Mar. 27, 2003

(30) Foreign Application Priority Data

Aug. 25, 2001 (DE) .......................................... 101 41 721

(51) Int. Cl.[7] .................................................. B64C 1/14
(52) U.S. Cl. .................. 244/129.5; 244/119; 244/129.4
(58) Field of Search .......................... 244/117 R, 129.5, 244/119, 129.1, 129.4, 123; 428/911, 912, 183

(56) References Cited

U.S. PATENT DOCUMENTS

| | | | | |
|---|---|---|---|---|
| 2,763,900 A | * | 9/1956 | Mcafee et al. ............ | 244/129.5 |
| 3,004,303 A | * | 10/1961 | Wilmer .................... | 244/129.5 |
| 4,048,365 A | * | 9/1977 | Hoover ........................ | 428/911 |
| 4,081,581 A | * | 3/1978 | Littell, Jr. ................... | 428/911 |
| 4,344,591 A | * | 8/1982 | Jackson ................... | 244/158 A |
| 4,524,556 A | * | 6/1985 | Sarh et al. ................ | 52/793.11 |
| 4,715,560 A | * | 12/1987 | Loyek ..................... | 244/117 R |
| 4,811,540 A | * | 3/1989 | Kallies et al. ............... | 244/123 |
| 5,180,121 A | * | 1/1993 | Banks et al. ............. | 244/129.5 |
| 5,704,569 A | * | 1/1998 | Daniels .................... | 244/129.5 |
| 5,857,510 A | * | 1/1999 | Krupke et al. | |
| 6,308,463 B1 | * | 10/2001 | Bennett ........................ | 49/501 |
| 6,322,022 B1 | * | 11/2001 | Fay et al. .................... | 244/121 |
| 6,554,226 B2 | * | 4/2003 | Bold et al. ................ | 244/129.5 |
| 6,562,435 B1 | * | 5/2003 | Brillhart, III, et al. ....... | 428/113 |
| 6,568,637 B2 | * | 5/2003 | Bluem et al. ............. | 244/129.5 |
| 6,569,787 B1 | * | 5/2003 | Snelling ..................... | 428/911 |
| 6,655,634 B2 | * | 12/2003 | Erben et al. ............. | 244/129.5 |

* cited by examiner

Primary Examiner—Michael J. Carone
Assistant Examiner—L. Semunegus
(74) Attorney, Agent, or Firm—Crowell & Moring LLP

(57) ABSTRACT

A supporting arm of a passenger door of an aircraft, has a curved structure which forms hollow chambers and movably connects the passenger door to a frame on the fuselage. Receiving means one for the supporting arm for receiving connecting means which enable a movable connection on the one hand to the passenger door and a pivoting drive and on the other hand to the frame on the fuselage, so that the door is movable by means of the supporting arm on a linear-displacement path and a pivoting path. The structure of the supporting arm is formed from fiber composite, the structure-forming fiber composite being formed from individual structural elements. This fiber composite structure further improves the thermal insulation of the supporting arm and nevertheless achieves a further weight reduction of the supporting arm, while maintaining exacting structural safety requirements for the latter.

23 Claims, 4 Drawing Sheets

SUPPORTING ARM OF A PASSENGER DOOR OF AN AIRCRAFT

BACKGROUND AND SUMMARY OF THE INVENTION

This application claims the priority of Application No. 101 41 721.7, filed Aug. 25, 2001, in Germany, the disclosure of which is expressly incorporated by reference herein.

The invention relates to a supporting arm of a passenger door of an aircraft, comprising a curved structure which forms hollow chambers and movably connects the passenger door to a frame on the fuselage, there being formed on the supporting arm receiving means for receiving connecting means which enable a movable connection on the one hand to the passenger door and a pivoting drive and on the other hand to the frame on the fuselage, so that the door is movable by means of the supporting arm on a linear-displacement path and a pivoting path.

The passenger door opens and closes the fuselage opening to the passenger compartment (passenger cabin) of an aircraft.

The passenger door (also referred to as door hereinbelow) of an aircraft is mounted and held movably on a supporting arm by means of two triangular links. The supporting arm is arranged rotatably on the aircraft frame on the fuselage. Furthermore, an emergency opening drive, e.g. cylinder with push rod, is fastened on the one hand to the supporting arm and on the other hand to the door. This emergency opening drive allows the door to be moved in an emergency.

In the case of aircraft which are in service, this supporting arm is cast or milled in one piece from an aluminum alloy. This metal supporting arm produced in one piece has a hollow chamber design and is structurally optimized with regard to its aluminum alloy and its material thicknesses. The supporting arm constitutes a curved body which, in top plan view, has an outline curved in an L-shaped manner.

To receive connecting means, there are formed on the supporting arm receiving means, which are formed at the end faces of the supporting arm.

With respect to the frame on the fuselage, the supporting arm is mounted with its end-face receiving means on an axis of rotation arranged on the frame.

At the other end face of the supporting arm, receiving means there carry the triangular links, which are connected movably to the door.

The emergency opening drive is likewise held and mounted in a receiving means of the supporting arm, a force transmission means of the emergency opening drive being connected to the door.

The movement of the door is generally associated with the movement of the supporting arm.

The supporting arm guides the door during the opening and closing operation on a linear-displacement path and a pivoting path. In the process, the supporting arm carries the entire weight of the door and takes up stresses.

In the opened state of the door, the supporting arm inevitably reduces the emergency opening cross-section of the door opening. Its external shape, found hitherto, forms an optimum between the narrowing of the emergency opening cross-section and its functional tasks. There is therefore no desire to alter the external shape of the supporting arm.

This supporting arm forms a joint which movably connects the passenger door to the frame on the fuselage. For this purpose, there are formed on the supporting arm receiving means which enable a movable connection on the one hand to the passenger door and an emergency opening drive and on the other hand to the frame on the fuselage.

During an opening and closing operation, this supporting arm thus performs a joint function and movement function and, in an emergency, a so-called emergency opening function.

The supporting arm has to cope with complicated force flows (longitudinal and transverse forces, bending and torsional forces) in a confined space volume. For this reason, only materials with an isotropic structure have been employed for the supporting arm hitherto.

From the large number of possible stresses on a supporting arm, two serious stresses emerge. One of these stresses arises in the event of a fault involving a possible blockage of the door as it is being lifted and the other stress arises during the spreading-out as a result of the force of the emergency opening drive during the pivoting movement of the door.

The supporting arm, produced with a hollow chamber design, withstands these great stresses; nevertheless, in aircraft construction an improved lightweight construction of the door and hence a reduced weight of the supporting arm are also called for. Despite producing the supporting arm from cast aluminum, this supporting arm is still of relatively high weight.

Furthermore, the low thermal insulation of the supporting arm at cruising altitude is disadvantageous. After only one hour of flying, at an internal temperature of the cabin of 23° C. the supporting arm has a surface temperature of only about 8.5° C. This low temperature influences the well-being of the passenger sitting in the immediate vicinity.

An object of the invention is to further improve the thermal insulation of a supporting arm and nevertheless achieve a further weight reduction of the supporting arm, while maintaining exacting structural safety requirements for the latter.

The invention relates to a supporting arm of a passenger door of an aircraft. This supporting arm comprises a body which is curved in a substantially L-shaped manner and in which hollow chambers are formed. The L-shaped body runs in a substantially elongated and relatively flat manner, and then bends approximately at right angles in an end region. Its outer contour corresponds to the known contour of a supporting arm made of aluminum. According to the invention, the structure of the supporting arm is formed from fiber composite, an anisotropic material.

Fiber composite consists of fiber material which is embedded in a matrix of cured reaction resin compound. The supporting arm may, for example, consist of carbon fiber composite (CFC).

The structure-forming fiber composite is formed from individual structural elements. These structural elements are formed by fiber textile elements which are impregnated and cured in a production process.

The supporting arm made of fiber composite is produced in an RTM (Resin Transfer Molding) process. The RTM process uses in principle a mould, the mould comprising an upper mould part and a lower mould part, into which a preform is placeable in a precise-fitting manner.

The supporting arm made of fiber composite is produced by means of such an RTM process. In the production using an RTM process, the supporting arm is built up from individual fiber textile elements into a preform, i.e. assembled.

Fiber textile elements comprise a fiber arrangement which is already held by a matrix preimpregnated to a small extent. As a result of the RTM process, fiber textile elements form the structure of the supporting arm.

In order to build up such a preform for the RTM process, individual fiber textile elements are arranged in a manner appropriate to the stresses. The preform forms a semi-finished fiber textile product assembled into a single piece.

As the individual fiber textile elements for the preform, use is made of at least:

- belt elements made of woven fabric as longitudinally running webs for taking up preferably longitudinal forces,
- thick laminates as outer edge elements (wall elements) for taking up transverse forces and the bearing stress,
- belt covering elements, wherein a belt element lying in a horizontal plane is vertically spaced from a belt element lying in a different horizontal plane, and in a projection of the belt elements onto a horizontal plane, the belt elements are arranged, lying in the contour between top belt and bottom belt, so as to form a belt skeleton, and the belt elements are spaced and connected, in the region of the end faces of the belt elements, by belt covering elements, and the belt skeleton is connected by means of the narrow sides of the belt elements on both sides to an outer skin element in each case.

Alternatively, the individual fiber textile elements can also be arranged in such a way that a belt element lying in a horizontal plane runs with one end into a different horizontal plane and another belt element lying there runs with its end back into the plane of the belt element, so that both belt elements cross, and the belt elements are bounded, vertically spaced, by a top belt element and a bottom belt element, and the belt elements are spaced and connected, in the region of the end faces of the belt elements, by belt covering elements, and the belt skeleton is connected by means of the narrow sides of the belt elements on both sides to an outer skin element in each case.

At least the three fiber textile elements mentioned form a belt skeleton which forms hollow chambers.

The belt element has as the fiber textile element a multidirectional fiber orientation. This is particularly advantageous with regard to the stresses.

The individual fiber textile elements are joined together, for example, by sewing, bonding or the like, so as to produce a three-dimensional body, the preform, which forms a plurality of hollow chambers. The preform corresponds to the external shape and the structure of the supporting arm. This preform is placed into the mould for an RTM process. The upper mould part and the lower mould part, as well as possible inserts (mould cores), enclose the preform and result in a closed and sealed mould. For shaping reasons, individual mould cores may be necessary in the mould. However, this is not a requirement. Formed on the mould are attachment means. Each attachment means is connected to a resin injection device and a suction device. Both devices are controllable.

The heated and thus liquid reaction resin compound is injected under pressure into the closed mould. In the process, suction is applied at an opposite point on the mould. After complete impregnation, the preform is cured.

The reaction resin compound is a mixture of resin, hardener and additives and is referred to for short as "resin" hereinbelow. After the curing, the upper mould part and lower mould part are separated and the produced component is a supporting arm made of fiber composite. The supporting arm is then cleaned. Bores are made as attachment means for the connecting means. Metal bushes are bonded into the bores.

The supporting arm can also be produced, alternatively, with a half-shell design using a prepreg process.

The invention is explained below with the aid of individual exemplary embodiments and associated drawings.

Other objects, advantages and novel features of the present invention will become apparent from the following detailed description of the invention when considered in conjunction with the accompany drawings.

BRIEF DESCRIPTION OF THE DRAWINGS

FIG. 2 shows the structure of the supporting arm made of fiber composite, taken along section A—A of FIG. 1a.

DETAILED DESCRIPTION OF THE DRAWINGS

Figure 1:
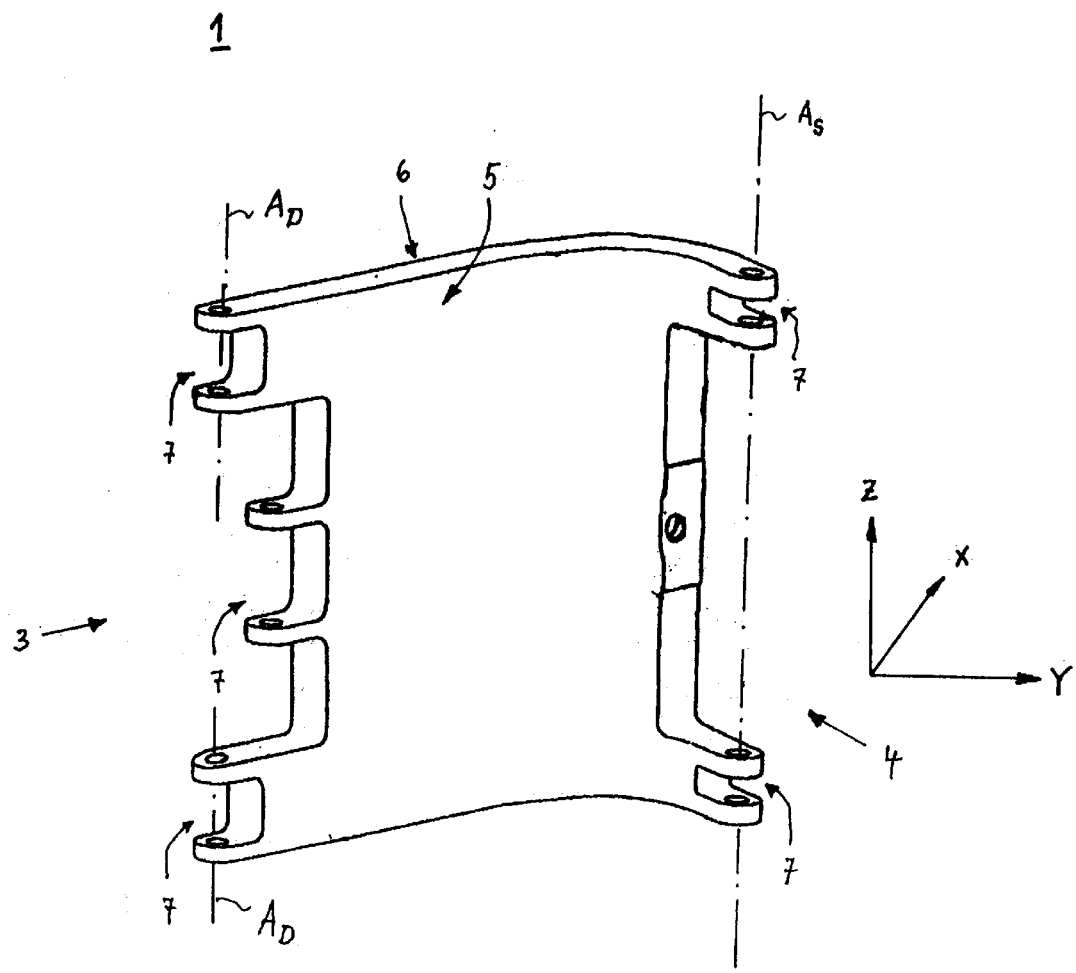
FIG. 1 is a perspective view of a supporting arm made of fiber composite constructed according to a preferred embodiment of the present invention.

FIG. 1 shows diagrammatically a supporting arm 1 made of fiber composite. Clearly evident is the body curved in a substantially L-shaped manner with the outer skin elements 5, 6. Formed at the end faces 3, 4 are receiving means 7 which have bores running in the Z-direction. These receiving means 7, of U-shaped design, serve to receive connecting means. The connecting means are not shown in the figure.

The receiving means 7 at the end face 4 on the right in the figure receive the pivot axis AS connected to the fuselage. The receiving means 7 at the end face 3 on the left in the figure receive the connecting means in the form of triangular links which form an axis of rotation AD. One of the receiving means at the end face 3 serves to receive the connecting means for the emergency opening drive.

This supporting arm 1 made of fiber composite achieves a weight reduction of at least 25% compared, for example, with a cast door. With the use of fiber composite material, the disadvantage of insufficient thermal insulation described in the prior art can be markedly improved, i.e. the passenger comfort can be markedly improved. The structure of the supporting arm 1 made of fiber composite also enables low-cost production, in that an efficient laying technique and modular design for the preform, and thus ultimately for the supporting arm, becomes possible in the production process.

The arm is not a homogenous piece but is made up of individual fiber-reinforced structural elements forming a framework covered by a skin. The space between the elements can be hollow or filled with a lightweight, possibly foam, material.

The fiber textile elements for building up the preform are arranged in a manner appropriate to the stresses. The structure of the supporting arm made of fiber composite is then able to take up and transmit preferably torsional forces or shearing forces resulting from a possible blockage as the door is being lifted or bending forces, such as those which occur as a result of the force of an opening drive as the door is being swung open.

The structure of a supporting arm made of fiber composite is therefore described below.

Figure 1A:
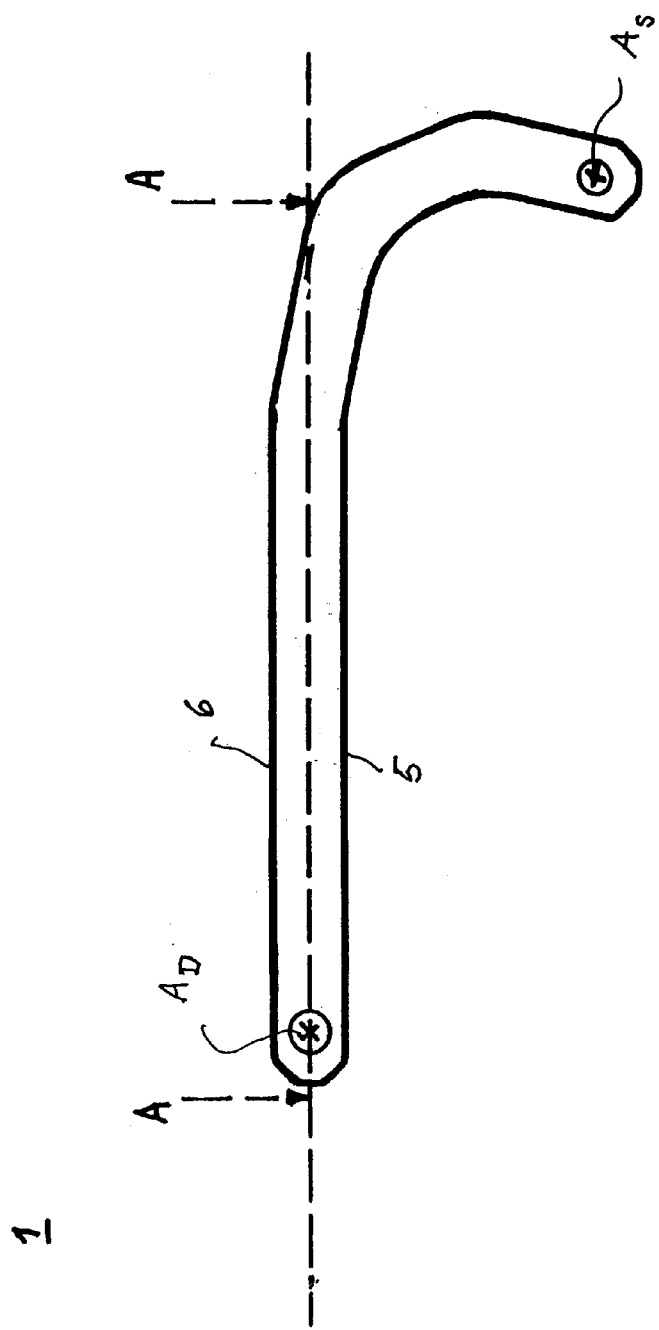
FIG. 1a is a top plan view of the supporting arm FIG. 1.

Starting from a top plan view of a supporting arm shown in FIG. 1a, a section A—A is marked on this figure. This section A—A is shown in FIG. 2.

Figure 2:
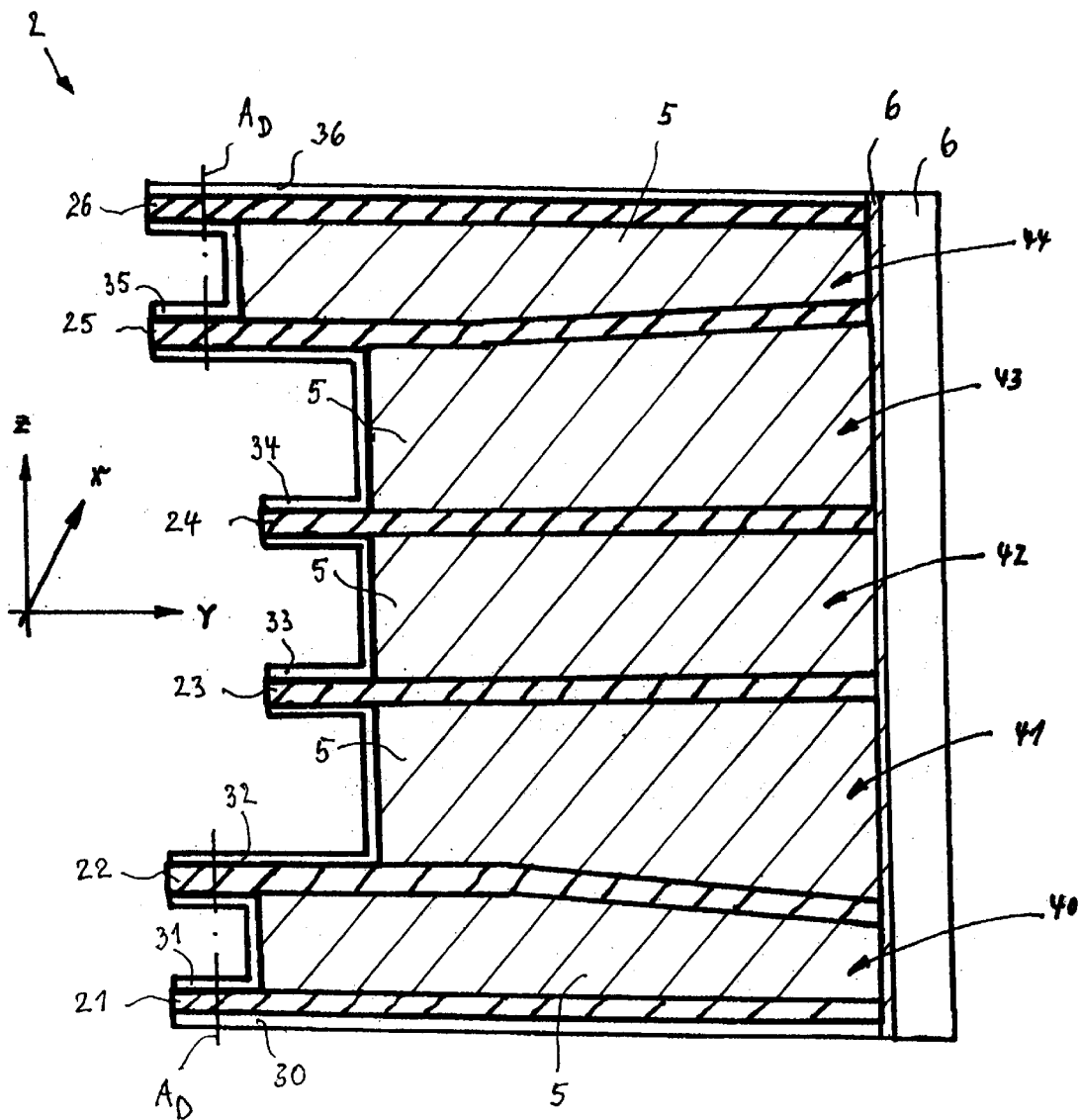

FIG. 2 reveals the structure of the supporting arm formed in the fiber composite. This supporting arm 1 is assigned to a three-dimensional coordinate system X, Y, Z.

In order to transmit bending forces into the supporting arm, belt elements 21, 22, 23, 24, 25, 26 are provided.

Each belt has a rectangular section in the XZ plane and lies with its broad side in the horizontal plane (XY-plane). The horizontal planes and hence the individual belt elements 21, 22, 23, 24, 25, 26 are vertically spaced from one another, but, in a projection onto a horizontal plane (XY-plane), arranged so as to lie below one another. The upper boundary of this arrangement is formed by a top belt element 26 and the lower boundary is formed by a bottom belt element 20. The belt elements 21, 22, 23, 24, 25, 26 form a so-called belt skeleton 2.

Some of these belts 21, 22, 25, 26 run from the axis of rotation $A_D$, arranged on the frame on the fuselage, as far as the pivot axis $A_S$ of the door.

The individual belt element is quasi-isotropically designed, i.e. the fiber orientation in the belt element is multidirectional, e.g., ±45° and 0°/90°.

Fitted into the region of the end faces of the belt elements, at the end with the axis of rotation $A_D$, are U-shaped elements, which are referred to as elements of the belt covering 31, 32, 33, 34, 35. An element of the belt covering 30, 36 is also found on the outer surface of the top belt element 26 and of the bottom belt element 21. The arms of the U extend along the respective belts and the bases extend between respective pairs of adjacent belts. The U-shaped elements are also rectangular in cross-section. The purpose of the belt covering is to enable the connection of the belt elements to the outer skin elements (outer wall) through enlarged bonding areas. The belt covering is formed from fiber fabric material (preferably ±45° fiber orientation).

In the structure of the supporting arm 1 formed from the belt elements and the elements of the belt covering, individual hollow chambers 40, 41, 42, 43, 44 lying behind one another in the Z-direction are already evident. Covered foam core elements (not shown) can be positively fitted into these hollow chambers. The covering of these elements is likewise a fiber textile element. The covered foam cores are, however, not absolutely necessary for the invention, although the use of covered foam cores as a molding aid improves the attachment of the two lateral outer skin elements 5, 6. The foam cores constitute an additional safety reserve of strength and rigidity which is not taken into account.

The two lateral outer skin elements 5, 6 are connected to the narrow sides of the belt elements 30, 31, 32, 33, 34, 35, 36 and thus tightly seal the hollow chambers 40, 41, 42, 43, 44 present. The lateral outer skin is designed as a half-shell. Both half-shells meet and are tightly connected. Hollow chambers are thus formed.

The hollow chamber design is advantageous in the case of a torsional stress, such as that which can occur, for example, in the event of the described blockage as the door is being lifted on the supporting arm. The transmission of the torsional forces is assisted by the lateral outer skin elements closing the chambers. The lateral outer skin elements provide support against buckling and resistance to torsion.

The belt covering element, the outer skin element, the covering of a foam core are advantageously formed from a laminate with a fiber orientation of ±45°.

The chosen arrangement of the belt elements makes it possible to transmit in an advantageous manner the bending forces which arise during the spreading-out as a result of the force of a pivoting drive into the supporting arm.

The chosen arrangement among belt elements, belt covering elements and the lateral outer skin elements and optionally the (covered) foam core elements produces a synthesis for optimally controlling the two types of loading mentioned at the outset.

Figure 3:
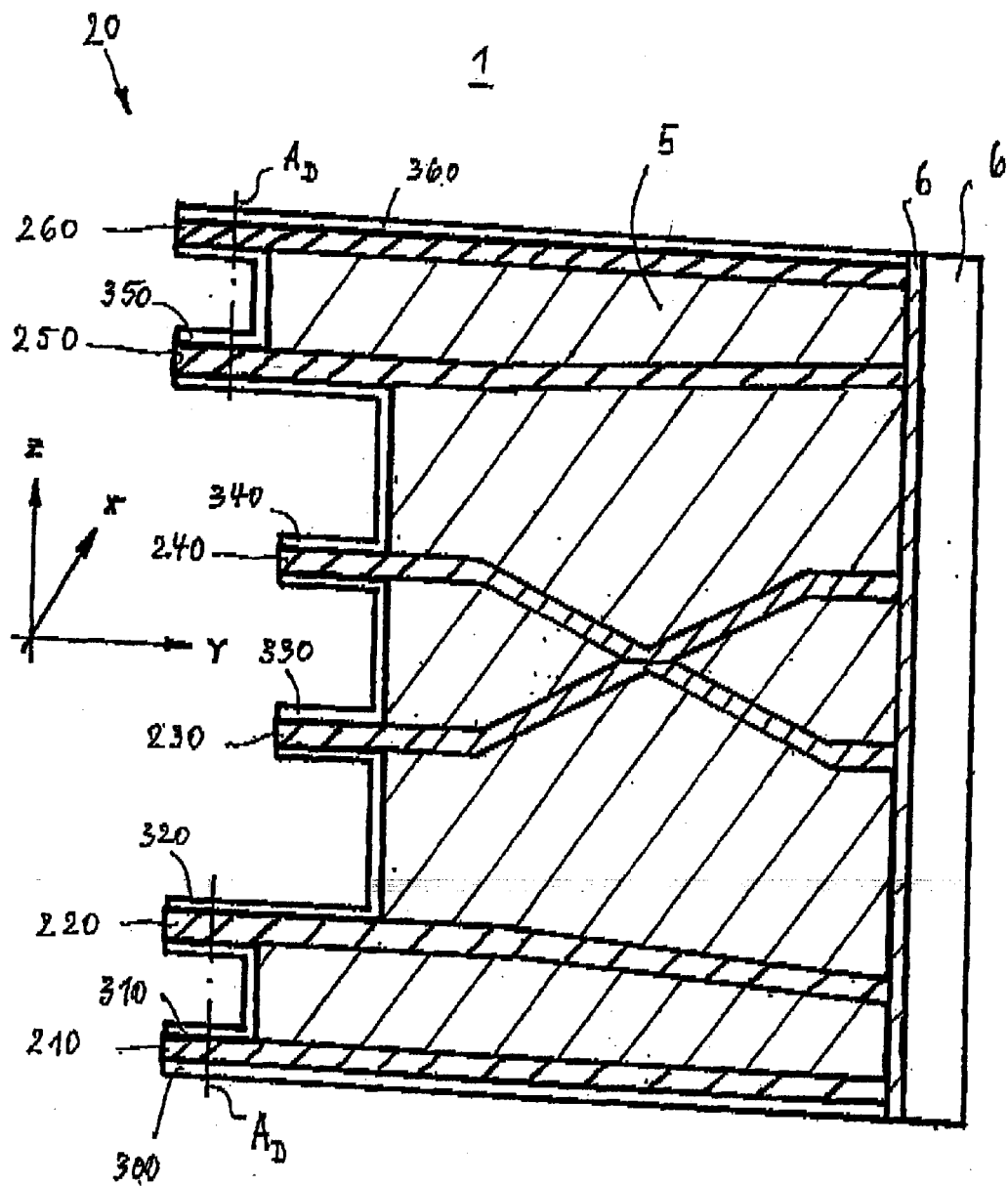
FIG. 3 is a view similar to FIG. 2, showing an alternative embodiment of the structure of a supporting arm made of fiber composite with crossing belt elements.

According to FIG. 3, a belt skeleton 20 can also be constructed with the existing belt elements 210, 220, 230, 240, 250, 260 in a different arrangement. FIG. 3 also corresponds to a section according to FIG. 1*a*.

It is possible to form a cross-shaped structure out of individual belt elements lying between top belt element 260 and bottom belt element 210. This situation is shown diagrammatically in FIG. 3. This means that, for example, a belt element 230 lying originally in the horizontal plane extends obliquely towards an adjacent element 240, e.g. in the positive (+) Z-direction, meets it and then returns to its original, horizontal plane.

On the other hand, an adjacent belt element 240 originally lying in a parallel plane runs obliquely in the negative (−) Z-direction, meets the first element and returns to its plane. The two belt elements 230, 240 thus form a crossing when viewed in the X-direction. This arrangement with two belt elements 230, 240 crossing can be made for other belt elements. The "crossing" can be fastened by adhesive, or a fiber tie, or by any other means.

Such an arrangement with individual belt elements crossing is expedient when particularly extreme torsional stresses may arise. Such an arrangement of the belt elements is then particularly advantageous.

As regards a production process, it should additionally be noted, finally, that production is possible not only by the RTM process but also in a so-called prepreg process. If a prepreg process were to be employed, a so-called shell design of the supporting arm to be produced from fiber composite could be realized. In a first working step, 2 part-shells cured as prepreg would be produced. Each part-shell is produced using preimpregnated textile products (wovens, knits). These are laminates already with about a 50% resin content. One half-shell is formed, for example, from an outer skin element with integrated belt elements and belt covering elements and the second half-shell is formed likewise from an outer skin element with integrated belt covering elements.

In a second working step, both part-shells are bonded together and form the structure of a supporting arm illustrated in FIG. 2.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Supporting arm for a passenger door of an aircraft, comprising a curved structure which forms hollow chambers and movably connects the passenger door to a frame on the fuselage, there being formed on the supporting arm receiving means for receiving connecting means which enable a movable connection on the one hand to the passenger door and a pivoting drive and on the other hand to the frame on the fuselage, so that the door is movable by means of the supporting arm on a linear-displacement path and a pivoting path, wherein the structure of the supporting arm is formed from fiber composite, the structure-forming fiber composite being formed from individual structural elements.

2. Supporting arm of a passenger door of an aircraft according to claim 1, wherein the structure of the supporting arm is formed from structural elements, including:
   a) belt elements,
   b) belt covering elements, and
   c) outer skin element,
wherein a belt element lying in a horizontal plane is vertically spaced from a belt element lying in a different horizontal plane, and
   in a projection of the belt elements onto a horizontal plane, the belt elements are arranged, lying in the contour between a top belt element and a bottom belt element, so as to form a belt skeleton, and the belt elements are spaced and connected, in a region of end faces of the belt elements, by belt covering elements, and the belt skeleton is connected by means of the narrow sides of the belt elements on both sides to an outer skin element in each case.

3. Supporting arm of a passenger door of an aircraft according to claim 1, wherein the structure of the supporting arm is formed from structural elements, including:
   a) belt elements,
   b) belt covering elements, and
   c) outer skin elements,
wherein a belt element lying at its ends in one horizontal plane extends in its central region towards an adjacent belt element and from there back into the plane of the belt element, and similarly the second element towards the first, so that the two belt elements form a cross, and the belt elements are bounded, vertically spaced, by a top belt element and bottom belt element, and the belt elements are spaced and connected, in the region of the end faces of the belt elements, by belt covering elements, and the top belt element and bottom belt element are also covered by a belt covering element, and the belt skeleton is connected by means of narrow sides of the belt elements on both sides to an outer skin element in each case.

4. Supporting arm of a passenger door of an aircraft according to claim 1, wherein the belt elements, belt covering elements and outer skin elements form hollow chambers in the structure of the supporting arm.

5. Supporting arm of a passenger door of an aircraft according to claim 2, wherein the belt elements have a multidirectional fiber orientation.

6. Supporting arm of a passenger door of an aircraft according to claim 3, wherein the belt elements have a multidirectional fiber orientation.

7. Supporting arm of a passenger door of an aircraft according to claim 4, wherein the belt elements have a multidirectional fiber orientation.

8. An aircraft passenger door supporting arm assembly, comprising a curved structure which forms hollow chambers and in use movably connects a passenger door to a fuselage frame, and
   wherein said curved structure includes a plurality of individual structural elements made of fiber composite material.

9. An aircraft passenger door supporting arm assembly which forms hollow chambers and in use movably connects a passenger door to a fuselage frame,
   comprising a plurality of individual structural elements made of fiber composite material,
   wherein said structural elements include:
      a) belt elements;
      b) belt covering elements; and
      c) outer skin elements.

10. An assembly according to claim 9, wherein a belt element lying in a horizontal plane is vertically spaced from a belt element lying in a different horizontal plane, and
    in a projection of the belt elements onto a horizontal plane, the belt elements are arranged, lying in the contour between a top belt element and a bottom belt element, so as to form a belt skeleton, and the belt elements are spaced and connected, in a region of end faces of the belt elements, by belt covering elements, and the belt skeleton is connected by means of the narrow sides of the belt elements on both sides to an outer skin element in each case.

11. An assembly according to claim 9, wherein a belt element lying at its ends in one horizontal plane extends in its central region towards an adjacent belt element and from there back into the plane of the belt element, and similarly the second element towards the first, so that the two belt elements form a cross, and the belt elements are bounded, vertically spaced, by a top belt element and bottom belt element, and the belt elements are spaced and connected, in the region of the end faces of the belt elements, by belt covering elements, and the top belt element and bottom belt element are also covered by a belt covering element, and the belt skeleton is connected by means of narrow sides of the belt elements on both sides to an outer skin element in each case.

12. An assembly according to claim 9, wherein the belt elements, belt covering elements and outer skin elements form hollow chambers in the structure of the supporting arm.

13. An assembly according to claim 10, wherein the belt elements, belt covering elements and outer skin elements form hollow chambers in the structure of the supporting arm.

14. An assembly according to claim 11, wherein the belt elements, belt covering elements and outer skin elements form hollow chambers in the structure of the supporting arm.

15. An assembly according to claim 9, wherein the belt elements have a multidirectional fiber orientation.

16. An assembly according to claim 10, wherein the belt elements have a multidirectional fiber orientation.

17. An assembly according to claim 11, wherein the belt elements have a multidirectional fiber orientation.

18. An assembly according to claim 12, wherein the belt elements have a multidirectional fiber orientation.

19. An assembly according to claim 13, wherein the belt elements have a multidirectional fiber orientation.

20. An assembly according to claim 14, wherein the belt elements have a multidirectional fiber orientation.

21. A method of making the assembly according to claim 9, comprising:
    forming part-shells using preimpregnated textile products, and
    bonding the part-shells together.

22. A method of making the assembly of claim 9, comprising:
    forming a first part-shell using preimpregnated textile products to form an outer skin element with integrated belt elements and belt covering elements,
    forming a second part-shell using preimpregnated textile products to form an outer skin element with integrated belt covering elements, and bonding the part-shells together.

23. A method of making the assembly according to claim 9, comprising using a resin transfer molding process.

* * * * *